UNITED STATES PATENT OFFICE.

ALFONS PEREIRA, OF STUTTGART, GERMANY.

ART OF PAINTING WITH DISTEMPER AND OTHER COLORS.

SPECIFICATION forming part of Letters Patent No. 481,282, dated August 23, 1892.

Application filed November 14, 1891. Renewed July 8, 1892. Serial No. 439,419. (No specimens.)

*To all whom it may concern:*

Be it known that I, ALFONS PEREIRA, a citizen of the German Empire, residing at Stuttgart, in the Kingdom of Würtemberg, Germany, have invented certain new and useful Improvements in the Art of Painting with Distemper and other Colors, of which the following is a specification.

In the art of painting in oil colors on a ground prepared for receiving said colors it is customary to mix the colors with a drier and asphaltum or with other similar substances. This method of painting in oil-colors is connected with some disadvantages, among which may be mentioned the darkening and cracking of modern paintings, by which they are changed in appearance, even after the lapse of a few years. Many complaints were made on all sides on account of the darkening and cracking of the pictures, and in consequence thereof many experiments were made with distemper colors, but without success, so that the artist discarded these methods and resumed the use of the old oil-color method.

My invention is intended to provide a new process of painting in distemper and majolica colors which avoids all these difficulties and which possesses many advantages. My new distemper colors are entirely soluble in water and can be applied in a manner not possible with the distemper colors heretofore known, as by means of my improved colors a head or figure can be laid down quicker and easier than with any other color known.

The distemper colors used heretofore had to be kept in water, and when placed upon the palette dried quickly and were liable to crack, while in case they were mixed with glue they had to be warmed before being used. My improved distemper colors remain fresh and moist, like oil-colors, on the palette, and as soon as they are mixed with the solvent or vehicle used in place of the white of egg or warm glue of ordinary distemper colors they dry in a few hours and retain their original shade without changing to a lighter shade, as do the ordinary distemper colors. The new distemper colors retain their color value and intensity in the same manner as oil colors and possess in their general treatment and property great similarity with the oil colors. In fact, they have all the advantages, but none of the disadvantages, of the oil colors.

My majolica colors are made of the finest majolica earths and have the property of forming a uniform covering layer and to be absorbed quickly by the surface to which they are applied. They are several degrees lighter and finer in the shade than ordinary colors, and thus with the latter produce an enlarged color-scale, and thus do not require the extensive use of white-metal color pigments.

A picture that is grounded with majolica colors obtains an exceedingly delicate and light tone, which greatly improves the finishing in oil or distemper colors, and which enhances the effects of translucent and deepening colors.

My improved colors are ground with a vehicle composed of forty grams of glycerine, forty drops of oleum Ros. Palm., (gent.,) and sixty grams of liquid yellow honey. This entirely clear and transparent drying material or vehicle can be kept for years without deterioration and remains liquid at all times, and possesses thus great advantages when compared with the glue which is used with ordinary distemper colors and which has to be heated before use.

For thinning the colors a solution is used which is composed of twenty-five grams of gelatine dissolved in six hundred and fifty grams of distilled water, to which solution, after filtering, are added twenty-five grams of acetic acid. As this solution is soluble in cold water, the brushes used can be cleaned in cold water quickly and easily at any time while painting, so that but few brushes are required. The colors mixed with this solution, which are entirely soluble in water, dry in a comparatively short time—that is, in about from six to twelve hours; but on the palette and picture they remain for a sufficient time in a moist condition, so as to permit of mixing and distributing the same in the same manner as oil-colors.

By my improved colors a large surface can be covered and finished in a much shorter time than with oil-colors. The new colors are immediately retained and held by the ground to which they are applied as soon as brought in contact therewith in contradistinction to oil-colors, which require a continued working and laying on with the brush. This renders these colors especially well adapted for large-sized decorations, as they can be handled much more easily than the ordinary distemper colors and as they can be extended much better than ordinary distemper colors and possess a greater brightness than the same.

The canvas that is used for my improved colors is prepared with a special ground. After the colors are dry they are provided with a coat or covering of a specially-prepared varnish, or finished in gum-colors. As the gum-colors, as well as the oil-colors, become dull in time and are apt to crack, it is necessary to use absolutely pure gum-colors—that is, such colors with which no fatty oils are mixed. The said gum-colors are mixed with the following solution: Three hundred and twenty-five grams of copaiba balsam, twenty-five grams of essence of lavender, fifteen grams of mastic, and fifteen grams of Damarra gum. In this mixture the brittleness of the gum and the pliability and softness of the copaiba balsam are both retained without either being prominent enough to act injuriously, and, furthermore, these gum-colors when mixed in the manner described dry within twenty-four hours when applied very thickly.

The use of the last-described gum-colors offers to artists considerable facilities in finishing paintings without impairing the brightness and permanency of the same.

Having thus described my invention, what I claim as new, and desire to secure by Letters Patent, is—

The improvement in the art of painting in distemper and majolica colors, which consists in laying on colors ground with a mixture of glycerine, honey, and palm-oil and thinned with a solution of a gelatinous body in water and acetic acid, and finally covering the painting after the above-mentioned colors are dry with pure gum-colors dissolved in a mixture of copaiba balsam, essence of lavender, mastic, and Damarra gum, substantially as set forth.

In testimony that I claim the foregoing as my invention I have signed my name in presence of two subscribing witnesses.

ALFONS PEREIRA.

Witnesses:
CARL FISCHER,
W. BLOSSFELDT.